United States Patent
Nomiyama et al.

(10) Patent No.: US 8,945,461 B2
(45) Date of Patent: Feb. 3, 2015

(54) METHOD FOR PRODUCING β-SIALON PHOSPHOR

(75) Inventors: Tomohiro Nomiyama, Machida (JP); Suzuya Yamada, Machida (JP); Hisayuki Hashimoto, Machida (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 354 days.

(21) Appl. No.: 13/500,487

(22) PCT Filed: Nov. 1, 2010

(86) PCT No.: PCT/JP2010/069448
§ 371 (c)(1),
(2), (4) Date: May 7, 2012

(87) PCT Pub. No.: WO2011/058902
PCT Pub. Date: May 19, 2011

(65) Prior Publication Data
US 2012/0223448 A1   Sep. 6, 2012

(30) Foreign Application Priority Data

Nov. 13, 2009  (JP) ................................. 2009-260243

(51) Int. Cl.
| C04B 35/597 | (2006.01) |
| C04B 41/85 | (2006.01) |
| C01B 21/082 | (2006.01) |
| C04B 35/645 | (2006.01) |
| C04B 41/00 | (2006.01) |
| C04B 41/50 | (2006.01) |
| C09K 11/08 | (2006.01) |
| C09K 11/77 | (2006.01) |
| C04B 111/80 | (2006.01) |

(52) U.S. Cl.
CPC ............. *C04B 41/85* (2013.01); *C01B 21/0826* (2013.01); *C01P 2002/52* (2013.01); *C01P 2002/54* (2013.01); *C01P 2002/84* (2013.01); *C01P 2004/61* (2013.01); *C04B 35/597* (2013.01); *C04B 35/6455* (2013.01); *C04B 41/009* (2013.01); *C04B 41/5016* (2013.01); *C04B 2111/807* (2013.01); *C04B 2235/3224* (2013.01); *C04B 2235/3865* (2013.01); *C04B 2235/3878* (2013.01); *C04B 2235/3895* (2013.01); *C04B 2235/428* (2013.01); *C04B 2235/5436* (2013.01); *C04B 2235/6562* (2013.01); *C04B 2235/658* (2013.01); *C04B 2235/6581* (2013.01); *C04B 2235/662* (2013.01); *C04B 2235/767* (2013.01); *C04B 2235/9646* (2013.01); *C09K 11/0883* (2013.01); *C09K 11/7734* (2013.01)
USPC ........................................................ 264/604

(58) Field of Classification Search
CPC .......................... C04B 35/597; C04B 35/6455
USPC ........................................................ 264/604
See application file for complete search history.

(56) References Cited

U.S. PATENT DOCUMENTS

| 4,243,621 | A | 1/1981 | Mori et al. ...................... 264/65 |
| 8,709,282 | B2 * | 4/2014 | Ichikawa et al. ......... 252/301.4 F |
| 2008/0258602 | A1 | 10/2008 | Masuda et al. |
| 2009/0134775 | A1 * | 5/2009 | Watanabe et al. ............. 313/503 |
| 2010/0052515 | A1 * | 3/2010 | Watanabe et al. ............. 313/503 |
| 2010/0053932 | A1 | 3/2010 | Emoto et al. |
| 2010/0085728 | A1 * | 4/2010 | Seto et al. ........................ 362/84 |
| 2010/0200874 | A1 * | 8/2010 | Shioi et al. ...................... 257/91 |
| 2010/0213820 | A1 | 8/2010 | Sakai et al. |
| 2011/0121234 | A1 * | 5/2011 | Hirosaki ................. 252/301.4 F |
| 2012/0313507 | A1 * | 12/2012 | Hashimoto et al. ........... 313/503 |
| 2013/0093314 | A1 * | 4/2013 | Takeda et al. .................. 313/503 |

FOREIGN PATENT DOCUMENTS

| EP | 1 867 698 A1 | 12/2007 |
| EP | 2 093 272 A1 | 8/2009 |
| JP | 2002-309249 | 10/2002 |
| JP | 2007-262417 | 10/2007 |
| JP | 2008-127547 | 6/2008 |
| JP | 2009-256427 | 11/2009 |
| WO | WO2007/066733 | * 6/2007 |
| WO | WO 2008/062781 | 5/2008 |
| WO | WO 2009/048150 | 4/2009 |

OTHER PUBLICATIONS

European Search Report mailed Apr. 11, 2013, issued in corresponding European Application No. 10829862.1-1354/2500333.
International Search Report issued in International Application No. PCT/JP2010/069448 on Feb. 15, 2011.

* cited by examiner

Primary Examiner — Joseph S Del Sole
Assistant Examiner — Russell Kemmerle, III
(74) Attorney, Agent, or Firm — Stein IP, LLC

(57) ABSTRACT

Provided is a production method of a β-sialon phosphor that europium ions are solid-solved in β-sialon, including a mixing process for mixing raw materials of the β-sialon phosphor; a burning process for burning the raw materials after the mixing process to form the β-sialon phosphor; a HIP treatment process in which the β-sialon phosphor after the burning process is subjected to a HIP treatment; an annealing process in which the β-sialon phosphor after the HIP treatment process is subjected to an annealing treatment; and an acid treatment process in which the β-sialon phosphor after the annealing process is subjected to an acid treatment. According to the production method of a β-sialon phosphor, a β-sialon phosphor excellent in luminescence intensity is obtained.

10 Claims, No Drawings

METHOD FOR PRODUCING β-SIALON PHOSPHOR

CROSS-REFERENCE TO RELATED APPLICATIONS

This application is a National Phase of PCT International Patent Application No. PCT/JP2010/069448 filed Nov. 1, 2010, and claims priority benefit to Japanese Patent Application No. 2009-260243, filed Nov. 13, 2009, in the Japanese Office, the disclosures of which are incorporated herein by reference.

BACKGROUND OF THE INVENTION

1. Field of the Invention

Present invention relates to a production method of a β-sialon phosphor (β-type sialon phosphor). More specifically, it relates to a production method of a β-sialon phosphor excellent in luminescence intensity upon receiving light from LED (Light Emitting Diode) and the like to emit light.

2. Description of the Related Art

In a process for producing a phosphor, for improving crystallinity and luminescence characteristics of the phosphor, HIP (Hot Isostatic Pressing) treatment has been adopted conventionally. "HIP treatment" is referred to as hot isostatic treatment, and is a process of filling a formed product or powder into a hot isostatic pressing followed by conducting a heat treatment under a high temperature and high pressure condition. Patent document 1 describes that a HIP treatment is applied to a process for producing a gallium nitride phosphor.

CITATION LIST

Patent Literature

[PTL 1] Japanese Unexamined Patent Application Publication No. 2002-309249

SUMMARY OF THE INVENTION

According to the above-described Patent document 1, a HIP treatment is applied to a process for producing a gallium nitride phosphor under a predetermined temperature and a predetermined pressure. However, the crystallinity and luminescence intensity of the phosphors were not improved necessarily by adopting a HIP treatment of the same condition in a process for producing phosphors other than a gallium nitride phosphor. In particular, regarding a β-sialon phosphor, it was difficult to improve the crystallinity and luminescence intensity.

Under the situations, the main purpose of the present invention is to provide a production method of a β-sialon phosphor excellent in luminescence intensity.

In order to solve the above-described problems, the present invention is a production method of a β-sialon phosphor that europium ions are solid-solved in β-sialon, and it provides a production method of a β-sialon phosphor including a mixing process for mixing raw materials of the β-sialon phosphor; a burning process for burning the raw materials after the mixing process to form the β-sialon phosphor; a HIP treatment process in which the β-sialon phosphor after the burning process is subjected to a HIP treatment; an annealing process in which the β-sialon phosphor after the HIP treatment process is subjected to an annealing treatment; and an acid treatment process in which the β-sialon phosphor after the annealing process is subjected to an acid treatment.

In the production method of a β-sialon phosphor, even in the case that luminescence intensity of the β-sialon phosphor decreases by conducting a HIP treatment, afterward by conducting an annealing process and an acid treatment process, the luminescence intensity can be recovered and improved.

In the production method of a β-sialon phosphor, the HIP treatment process is a process where the β-sialon phosphor is placed under a nitrogen atmosphere at 1900.degree C. to 2500.degree C., 70 MPa to 200 MPa.

The annealing process is a process where the β-sialon phosphor is placed under an inactive gas atmosphere comprising mainly of a gas other than nitrogen at 1350.degree C. to 1650.degree C., or a process where it is placed in vacuum at 1200.degree C. to 1550.degree C.

The acid treatment process is a process where the β-sialon phosphor is soaked in a mixed acid of hydrofluoric acid and nitric acid, or ammonium hydrofluoride.

Further, the mixing process is a process where a mixed powder of metal silicon, aluminum nitride and europium oxide as raw materials is subjected to direct nitridation of silicon, or a process where silicon nitride, aluminum nitride and europium oxide are mixed as raw materials.

The present invention provides a production method of a β-sialon phosphor excellent in luminescence intensity.

Additional aspects and/or advantages of the invention will be set forth in part in the description which follows and, in part, will be obvious from the description, or may be learned by practice of the invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The production method of the β-sialon phosphor of the present invention is a production method of a β-sialon phosphor that $Eu^{2+}$ is solid-solved in β-sialon expressed by $Si_{6-z}Al_zO_zN_{8-z}$, including a mixing process for mixing raw materials of the β-sialon phosphor; a burning process for burning the raw materials after the mixing process to form the β-sialon phosphor; a HIP treatment process in which the β-sialon phosphor after the burning process is subjected to a HIP (Hot Isostatic Pressing) treatment; an annealing process in which the β-sialon phosphor after the HIP treatment process is subjected to an annealing treatment; and an acid treatment process in which the β-sialon phosphor after the annealing process is subjected to an acid treatment.

β-sialon is one in which Al is substituted and solid-solved in a Si position of β-type silicon nitride, and O is substituted and solid-solved in a N position thereof. Since there are two formula weight atoms in a unit cell, β-sialon is expressed as the general formula "$Si_{6-z}Al_zO_zN_{8-z}$". The composition z is preferably 0 to 4.2, and the mole ratio of (Si, Al)/(N,O) must maintain 3/4.

[Mixing Process]

The mixing process is (1) a process where a mixed powder of metal silicon (Si), aluminum nitride (AlN) and europium oxide ($Eu_2O_3$) as raw materials is subjected to direct nitridation of silicon, or (2) a process where silicon nitride ($Si_3N_4$), aluminum nitride (AlN) and europium oxide ($Eu_2O_3$) are mixed as raw materials.

As the europium compounds, there are Eu compounds selected from metal, oxide, carbonate, nitride and acid nitride of europium, and europium oxide ($Eu_2O_3$) is preferable. In the mixing process, aluminum oxide may be added.

As a specific method of the mixing process, there are a method of dry-mixing, a method that after wet-mixing in an inactive solvent practically not reacted with each component of raw materials, the solvent is removed, and the like. As the mixing machines, there are a V-type mixing machine, rocking mixer, ball mill, vibration mill, and the like.

[Burning Process]

The burning process is a process where raw material-mixed powder is filled in a container made of a material not reacted with the raw materials (for example, boron nitride), and heated under a nitrogen atmosphere to promote a solid-solution reaction, thereby forming a β-sialon phosphor.

[HIP Treatment Process]

The HIP treatment process is a process where a β-sialon phosphor is filled in a hot isostatic pressing, and subjected to a heat treatment under a high temperature and high pressure condition. The HIP treatment process is suitably carried out under a nitrogen atmosphere.

The temperature of HIP treatment is preferably 1900.degree C. to 2500.degree C. The lower limit temperature is more preferably 2000.degree C., further preferably 2250.degree C. The upper limit temperature is more preferably 2400.degree C.

The pressure of HIP treatment is preferably 70 MPa to 200 MPa, more preferably 100 MPa to 180 MPa.

[Annealing Process]

The annealing process is a process where crystal defects and the secondary phase being present in a β-sialon phosphor and disturbing emission of visible light are converted into a state soluble in an acid used in an acid treatment process. Specifically, it is (1) a process where a β-sialon phosphor is placed under an inactive gas atmosphere comprising mainly of a gas other than nitrogen at 1350.degree C. to 1650.degree C., or (2) a process where a β-sialon phosphor is placed in vacuum at 1200.degree C. to 1550.degree C. As the inactive gas, there is nitrogen, argon or helium, and argon is preferable.

[Acid Treatment Process]

The acid treatment process is a process of dissolving away emission-disturbing factors (crystal defect and secondary phase) that were converted in the annealing process. By the removal of emission-disturbing factors, luminescence intensity of the β-sialon phosphor obtained is improved.

As the acids used in the acid treatment, there are one kind, or two kinds or more of acids selected from hydrofluoric acid, sulfuric acid, phosphoric acid, hydrochloric acid and nitric acid, and preferably a mixed acid of hydrofluoric acid and nitric acid, or ammonium hydrofluoride is used.

The acid treatment process is carried out, in a specific method, by dispersing the β-sialon phosphor after the annealing process in an aqueous solution including the above-mentioned acid, mixing and reacting them for about several minutes to several hours. The temperature of the acid may be room temperature or about 50.degree C. to 80.degree C. After the acid treatment, the β-sialon particles and the acid are separated by a filter and the like, then they are preferably washed with water.

EXAMPLES

Example 1

[Mixing Process]

Using a mortar and a pestle made of silicon nitride sintered body, there were mixed 96.41 mass % of silicon powder manufactured by JAPAN Pure Chemical Co., Ltd. (purity 99.99% or more, particle diameter 45 μm or less), 1.16 mass % of aluminum nitride powder manufactured by Tokuyama Corporation (E grade) and 2.43 mass % of europium oxide powder manufactured by Shin-Etsu Chemical Co., Ltd. (RU grade). The mixture was all passed through a sieve of 250 μm opening to remove aggregation, thereby obtaining raw material-mixed powder.

The raw material-mixed powder was filled in a cylindrical container made of boron nitride of diameter 40 mm×height 30 mm with a lid (manufactured by Denki Kagaku Kogyo Kabushiki Kaisha, "N-1" grade), and it was subjected to a nitriding treatment in an electric furnace with a carbon heater in a pressured nitrogen atmosphere of 0.50 MPa at 1550.degree C. for 8 hours. The rate of temperature increase in heating was set to 20.degree C./min from room temperature to 1200.degree C. and then 0.5.degree C./min to 1550.degree C. The resulting product was clumpy, and this was ground by a mortar and a pestle made of silicon nitride sintered body. The ground powder was classified by a sieve of 45 μm opening, and powder of 45 μm or less was used as Eu-activated Al-containing silicon nitride powder for synthesizing a phosphor. The compounding ratio here is designed to be z=0.05 in the general formula of β-sialon: $Si_{6-z}Al_zO_zN_{8-z}$ except europium oxide.

[Burning Process]

The Eu-activated Al-containing silicon nitride powder was filled in a cylindrical container made of boron nitride with a lid (manufactured by Denki Kagaku Kogyo Kabushiki Kaisha, "N-1" grade), and it was subjected to a burning process in an electric furnace with a carbon heater in a pressured nitrogen atmosphere of 0.8 MPa at 2000.degree C. for 8 hours. The clumpy product obtained was crushed to a slight degree, thereafter, the particle size and the particle shape were homogenized.

Table 1 shows the absorption coefficient, internal quantum efficiency, external quantum efficiency and emission peak strength of the β-sialon phosphor after completion of the burning process.

TABLE 1

| | Absorption coefficient (%) | Internal quantum efficiency (%) | External quantum efficiency (%) | Emission peak strength (%) |
|---|---|---|---|---|
| After burning process | 68.6 | 44.5 | 30.5 | 144 |
| After HIP treatment process | 71.6 | 29.3 | 21.0 | 96 |
| After acid treatment process | 71.3 | 73.1 | 52.1 | 226 |

The absorption coefficient, internal quantum efficiency, and external quantum efficiency were obtained as follows.

A standard reflector of 99% reflectance (manufactured by Labsphere Corporation, Spectralon) was set in a sample part, and spectra of excitation light dispersed to wavelength of 455 nm were measured, from the spectra in a wavelength range of 450 to 465 nm, excitation light photon number (Qex) was calculated. Next, a phosphor was set to the sample part and irradiated by blue light dispersed to wavelength of 455 nm, and from the spectra data obtained, reflected excitation light photon number (Qref) and fluorescence photon number (Qem) were calculated. The reflected excitation light photon number was calculated in the same wavelength range of the excitation light photon number, and the fluorescence photon number was calculated in a range of 465 to 800 nm. From three kinds of the photon numbers obtained, the external quantum efficiency (=Qem/Qex×100), absorption coefficient (=(Qex−Qref)×100), and inner quantum efficiency (=Qem/(Qex−Qref)×100) were obtained.

Emission peak strength is an index of luminescence intensity, and specifically it is obtained as follows.

Using a fluorescence spectrophotometer (manufactured by Hitachi High-Technologies Co., Ltd. "F4500"), luminescence intensity was measured when blue monochromatic light of wavelength 455 nm was irradiated. The luminescence intensity was expressed by a relative peak strength (%).

[HIP Treatment Process]

The β-sialon phosphor after the burning process was subjected to a HIP treatment process. The HIP treatment process was conducted in such a manner that the β-sialon phosphor was placed under a nitrogen atmosphere at 2350.degree C. and 150 MPa for 1 hour.

Table 1 shows the absorption coefficient, internal quantum efficiency, external quantum efficiency and emission peak strength of the β-sialon phosphor after completion of the HIP treatment process.

[Annealing Process]

The β-sialon phosphor after the HIP treatment process was subjected to an annealing process. The annealing process was conducted in such a manner that the β-sialon phosphor was placed under an argon gas atmosphere at 1350.degree C. for 8 hours.

[Acid Treatment Process]

The β-sialon phosphor after the annealing process was subjected to an acid treatment process. The acid treatment process was conducted in such a manner that the β-sialon phosphor was soaked in a mixed acid of hydrofluoric acid and nitric acid for 30 minutes.

After the acid treatment process, the particles of the β-sialon phosphor were separated from the acid by a filter made of synthetic resin, and further washed with water. Table 1 shows the absorption coefficient, internal quantum efficiency, external quantum efficiency and emission peak strength of the β-sialon phosphor obtained.

As shown in Table 1, in comparison with the β-sialon phosphor after the burning process, emission peak strength of the β-sialon phosphor after the HIP treatment decreases, but afterward by conducting the annealing process and acid treatment process, the emission peak strength was able to be remarkably improved.

Example 2

[Mixing Process]

Using a V-type mixing machine (manufactured by Tsutsui Scientific Instruments Co., Ltd., "S-3"), there were mixed 98.086 mass % of a-type silicon nitride powder manufactured by Ube Industries, Ltd. ("SN-E10" grade, oxygen content 1.0 mass %), 1.161 mass % of aluminum nitride powder manufactured by Tokuyama Corporation ("E" grade, oxygen content 0.8 mass %), and 0.753 mass % of europium oxide powder manufactured by Shin-Etsu Chemical Co., Ltd. ("RU" grade). The mixture was all passed through a sieve of 250 μm opening to remove aggregation, thereby obtaining raw material-mixed powder. The compounding ratio here is designed to be z=0.08 in the general formula of β-sialon: $Si_{6-z}Al_zO_zN_{8-z}$ except europium oxide.

[Burning Process] to [Acid Treatment Process]

A β-sialon phosphor was produced by conducting the burning process, HIP treatment process, annealing process and acid treatment process in the same manner as in Example 1. Table 2 shows the absorption coefficient, internal quantum efficiency, external quantum efficiency and emission peak strength of the β-sialon phosphor after completion of the burning process, after completion of the HIP treatment process, and after completion of the acid treatment process.

TABLE 2

| | Absorption coefficient (%) | Internal quantum efficiency (%) | External quantum efficiency (%) | Emission peak strength (%) |
|---|---|---|---|---|
| After burning process | 53.0 | 47.8 | 25.3 | 103 |
| After HIP treatment process | 54.4 | 41.6 | 22.6 | 99 |
| After acid treatment process | 56.7 | 89.0 | 50.5 | 206 |

As shown in Table 2, in comparison with the β-sialon phosphor after the burning process, emission peak strength of the β-sialon phosphor after the HIP treatment decreases, but afterward by conducting the annealing process and acid treatment process, the emission peak strength was able to be remarkably improved.

As another Example, for the β-sialon phosphor obtained in the same manner as in Example 1 except that the annealing process was conducted in vacuum at 1350.degree C., the emission peak strength was able to be remarkably improved.

As still another Example, for the β-sialon phosphor obtained in the same manner as in Example 1 except that the acid used in the acid treatment process was changed with ammonium hydrofluoride, the emission peak strength was able to be remarkably improved.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A production method of a β-sialon phosphor that europium ions are solid-solved in β-sialon, comprising:
   a mixing process for mixing raw materials of the β-sialon phosphor;
   a burning process for burning the raw materials after the mixing process to form the β-sialon phosphor;
   a HIP treatment process in which the β-sialon phosphor after the burning process is subjected to a HIP (Hot Isostatic Pressing) treatment;
   an annealing process in which the β-sialon phosphor after the HIP treatment process is subjected to an annealing treatment; and
   an acid treatment process in which the β-sialon phosphor after the annealing process is subjected to an acid treatment, wherein:
   the HIP treatment process is carried out at 2250° C. to 2550° C., and
   the annealing process is a process that the β-sialon phosphor is placed under an inactive gas atmosphere comprising mainly of a gas other than nitrogen at 1350° C. to 1650° C., or a process that it is placed in vacuum at 1200° C. to 1550° C.

2. The production method of a β-sialon phosphor of claim 1, wherein the HIP treatment process is a process that the β-sialon phosphor is placed under a nitrogen atmosphere at 2250° C. to 2500° C., 70 MPa to 200 MPa.

3. The production method of a β-sialon phosphor of claim 2, wherein the acid treatment process is a process that the β-sialon phosphor is soaked in a mixed acid of hydrofluoric acid and nitric acid, or ammonium hydrofluoride.

4. The production method of a β-sialon phosphor of claim 2, wherein the mixing process is a process that a mixed powder of metal silicon, aluminum nitride and europium oxide as raw materials is subjected to direct nitridation of silicon.

5. The production method of a β-sialon phosphor of claim 2, wherein the mixing process is a process that silicon nitride, aluminum nitride and europium oxide are mixed as raw materials.

6. The production method of a β-sialon phosphor of claim 1, wherein the acid treatment process is a process that the β-sialon phosphor is soaked in a mixed acid of hydrofluoric acid and nitric acid, or ammonium hydrofluoride.

7. The production method of a β-sialon phosphor of claim 6, wherein the mixing process is a process that a mixed powder of metal silicon, aluminum nitride and europium oxide as raw materials is subjected to direct nitridation of silicon.

8. The production method of a β-sialon phosphor of claim 6, wherein the mixing process is a process that silicon nitride, aluminum nitride and europium oxide are mixed as raw materials.

9. The production method of a β-sialon phosphor of claim 1, wherein the mixing process is a process that a mixed powder of metal silicon, aluminum nitride and europium oxide as raw materials is subjected to direct nitridation of silicon.

10. The production method of a β-sialon phosphor of claim 1, wherein the mixing process is a process that silicon nitride, aluminum nitride and europium oxide are mixed as raw materials.

\* \* \* \* \*